United States Patent
Ogasawara

(10) Patent No.: US 9,489,235 B2
(45) Date of Patent: Nov. 8, 2016

(54) REQUEST PROCESSING SYSTEM, METHOD AND PROGRAM PRODUCT

(75) Inventor: Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1269 days.

(21) Appl. No.: 13/104,710

(22) Filed: May 10, 2011

(65) Prior Publication Data

US 2011/0282920 A1    Nov. 17, 2011

(30) Foreign Application Priority Data

May 12, 2010   (JP) ................................. 2010-110655

(51) Int. Cl.
*G06F 7/00*    (2006.01)
*G06F 17/30*   (2006.01)
*G06F 9/48*    (2006.01)
*G06F 12/02*   (2006.01)

(52) U.S. Cl.
CPC .......... *G06F 9/4881* (2013.01); *G06F 12/0269* (2013.01); *G06F 17/30138* (2013.01); *G06F 2209/485* (2013.01); *G06F 2209/548* (2013.01)

(58) Field of Classification Search
CPC ..................... G06F 17/30138; G06F 12/0253
USPC .......................... 707/687, 688, 813; 711/100
See application file for complete search history.

(56) References Cited

U.S. PATENT DOCUMENTS

| | | | |
|---|---|---|---|
| 6,266,742 B1 * | 7/2001 | Challenger et al. .......... 711/133 |
| 7,415,453 B2 * | 8/2008 | Suzuki et al. ................. 707/2 |
| 7,415,491 B2 | 8/2008 | Sekiguchi | |
| 2003/0093416 A1 * | 5/2003 | Akaboshi et al. ............. 707/3 |
| 2005/0188175 A1 * | 8/2005 | Chiang et al. ............... 711/206 |
| 2009/0187614 A1 * | 7/2009 | Clee et al. ................... 707/206 |

FOREIGN PATENT DOCUMENTS

| | | |
|---|---|---|
| JP | 07-093170 | 4/1995 |
| JP | 2007-328413 | 12/2007 |
| JP | 2008-204243 | 9/2008 |

* cited by examiner

Primary Examiner — Marc Somers

(74) Attorney, Agent, or Firm — Steven M. Greenberg, Esq.; CRGO Law

(57) ABSTRACT

A processing method has been claimed for reducing the average wait time of requests in a queue in a system environment where garbage collection may occur. In the method, a computer system treats as a unit each request in a queue and a completion time of garbage collection that may occur at the time of processing the request, and processes requests preferentially and systematically in ascending order of the processing times of the units including the garbage collection times, thereby, reducing the average wait time of the requests. While, the computer system managing the queue knows the remaining amount of heap just before processing a certain request, the computer system statistically calculates in advance the amounts of heap to be consumed on a request type basis and holds the values. Accordingly, before processing a certain request, the computer system can predict whether or not the processing of the request will cause garbage collection, in consideration of the estimated heap consumption of the request and the remaining amount of heap in the memory.

10 Claims, 11 Drawing Sheets

REQUEST PROCESSING SYSTEM, METHOD AND PROGRAM PRODUCT

CROSS-REFERENCE TO RELATED APPLICATIONS

This application claims priority under 35 U.S.C. §119(a) to Japanese Patent Application Number 2010-110655, filed May 12, 2010, entitled "REQUEST PROCESSING SYSTEM, METHOD AND PROGRAM PRODUCT", the entirety of which is incorporated herein by reference.

FIELD OF THE INVENTION

The present invention relates to a computer system which sequentially receives requests, enqueues the requests in a queue and then processes the requests, like a web server. More specifically, the present invention relates to an increase in the efficiency of the processing of the requests waiting in the queue.

BACKGROUND OF THE INVENTION

In recent years, the number of web servers located on the Internet and accessible from client systems has been increasing along with prosperity in the development of the Internet technology. Normally, a web server receives processing requests from a large number of client computers via the Internet but cannot process the requests at once. Thus, the web server once enqueues the requests in a queue and then sequentially processes the requests.

Accordingly, a technique to process such requests in the queue as promptly as possible in a well-organized manner is in demand. However, a JAVA (trademark) based server often used as a web server lately executes garbage collection when the server attempts to process a certain request but finds that the remaining amount of heap is not sufficient to process the request. While the garbage collection is executed, all the application threads are stopped and resumed when the garbage collection is completed. Here, such a phenomenon of garbage collection causing all the application threads to stop once is called "Stop the world."

If such occurrence of garbage collection is taken into consideration, the queuing schemes of the aforementioned conventional techniques cannot achieve the objective to reduce the average wait time of the requests. This is because these queuing schemes are not made in consideration of at which time point and which request causes garbage collection.

SUMMARY OF THE INVENTION

In accordance with an embodiment of the invention, a method is provided for processing requests preferentially and systematically in ascending order of processing times of units including garbage collection times by treating, as a unit, each request in a queue and a completion time of garbage collection that may occur at the time of processing the request. The computer system managing the queue, such as a web server, knows the remaining amount of heap just before processing a certain request. Meanwhile, the computer system statistically calculates in advance the amounts of heap to be consumed on a request type basis and then holds the values.

Accordingly, before processing a certain request, the computer system can predict whether or not the processing of the request will cause garbage collection, in consideration of an estimated heap consumption of the request and the remaining amount of heap in the memory. This is a rationale for treating, as a single unit, a request and a completion time of garbage collection that may occur at the time of processing the request.

Here, the processing time of a request itself is preferably taken into consideration as well. However, the garbage collection time is longer than the processing time of the request by far in general. Thus, while only the garbage collection time is focused, requests may be processed preferentially in ascending order of the processing times of the units.

As described above, according to the present invention, units are set in a system environment where garbage collection may occur, in such a manner that a single unit includes each request in a queue and a completion time of garbage collection that may occur at the time of processing the request. Then, among these units, processing of a unit determined to involve a short processing time including the garbage collection time is preferentially and systematically executed. This brings about an effect that the average wait time of the requests in a queue can be reduced.

Thus, as many requests as possible can be preferentially processed before garbage collection occurs by selecting the requests requiring only light processing, because the occurrence of garbage collection is unavoidable sooner or later.

DETAILED DESCRIPTION

Figure 1:
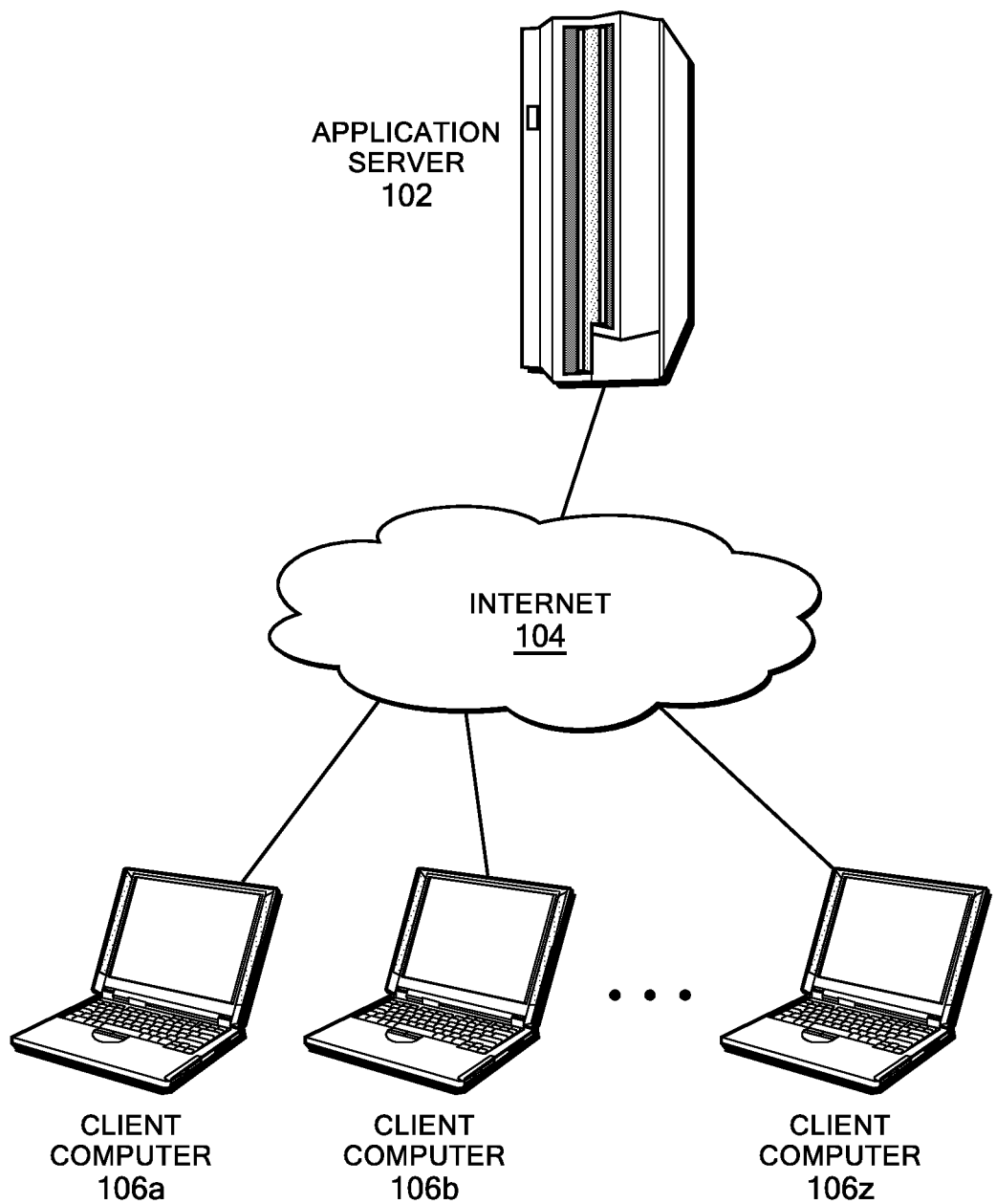
FIG. 1 is a diagram showing how client computers are connected to an application server via the Internet.

Hereinafter, an embodiment of the present invention will be described with reference to the drawings. Unless noted otherwise, the same reference numerals are used to denote the same targets throughout the drawings. In addition, it should be noted that the embodiment to be described below is only an embodiment of the present invention and is not intended to limit the present invention to the content described in this embodiment.

In FIG. 1, an application server 102 having a web server function as well receives requests from multiple client computers 106a, 106b, ... and 106z via the Internet 104 by use of a protocol such as Hypertext Transfer Protocol (HTTP). In the system shown in FIG. 1, the users of the client computers log into the application server 102 through a Web browser via a line of the Internet 104. Specifically, the users input a predetermined Uniform Resource Locator (URL) into a Web browser to display a predetermined page. Note that, the users may log into the application server 102 by use of a predetermined dedicated client application program instead of using the Web browser.

Figure 2:
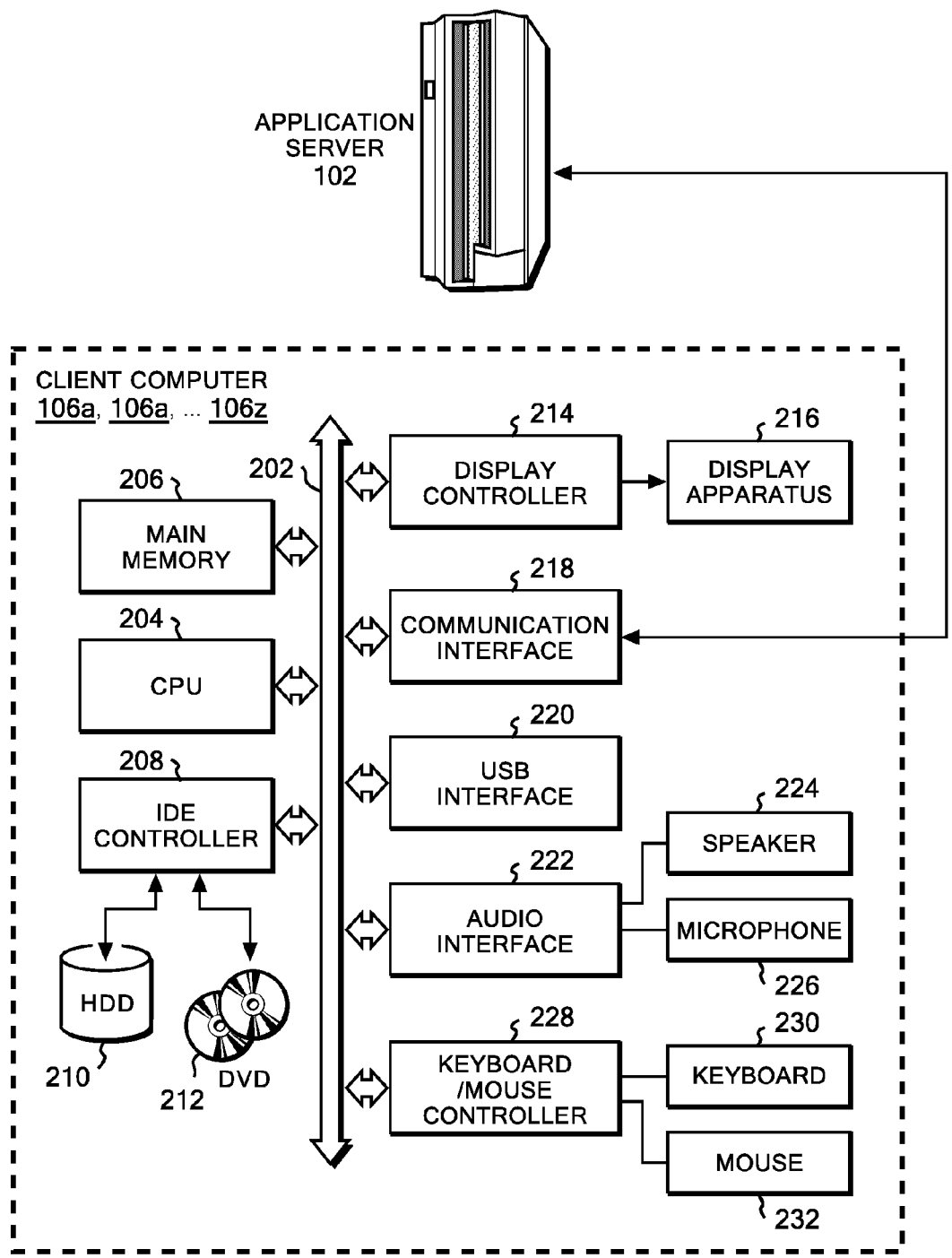
FIG. 2 is a diagram showing a hardware configuration of the client computers.

Next, a description will be given, with reference to FIG. 2, of a hardware block diagram of the client computers denoted by reference numerals 106a, 106b, ... and 106z in FIG. 1. In FIG. 2, the client computer includes a main memory 206, a CPU 204, and an IDE controller 208, and these components are connected to a bus 202. Furthermore, a display controller 214, a communication interface 218, a USB interface 220, an audio interface 222 and a keyboard and mouse controller 228 are connected to the bus 202. A hard disk drive (HDD) 210 and a DVD drive 212 are connected to the IDE controller 208. The DVD drive 212 is used as appropriate to install a program from a CD-ROM or a DVD. A display apparatus 216 having an LCD screen is preferably connected to the display controller 214. An application screen is displayed on the display apparatus 216 through a Web browser.

A device such as an extended hard disk is connectable to the USB interface 220 as needed.

A keyboard 230 and a mouse 232 are connected to the keyboard and mouse controller 228. The keyboard 230 is used for inputting a predetermined request message, a password and the like.

The CPU 204 may be any CPU based on a 32-bit architecture or a 64-bit architecture, and Pentium 4 (trademark of Intel Corporation) and Core (trademark) 2 Duo from Intel Corporation, Athlon (trademark) from AMD Inc., or the like can be used.

In the hard disk drive 210, at least an operating system and a browser (not shown) operating on the operating system are installed. Then, when the system is started, the operating system is loaded in the main memory 206. WINDOWS XP (trademark of Microsoft Corporation), WINDOWS VISTA (trademark of Microsoft Corporation), WINDOWS 7 (trademark of Microsoft Corporation), LINUX (trademark of Linus Torvalds) or the like can be used as the operating system. In addition, any browser such as INTERNET EXPLORER from Microsoft Corporation or MOZILLA FIREFOX from Mozilla Foundation can be used as the Web browser.

The communication interface 218 communicates with the application server 102 by an Ethernet (trademark) protocol or the like while using a TCP/IP communication function provided by the operating system.

Figure 3:
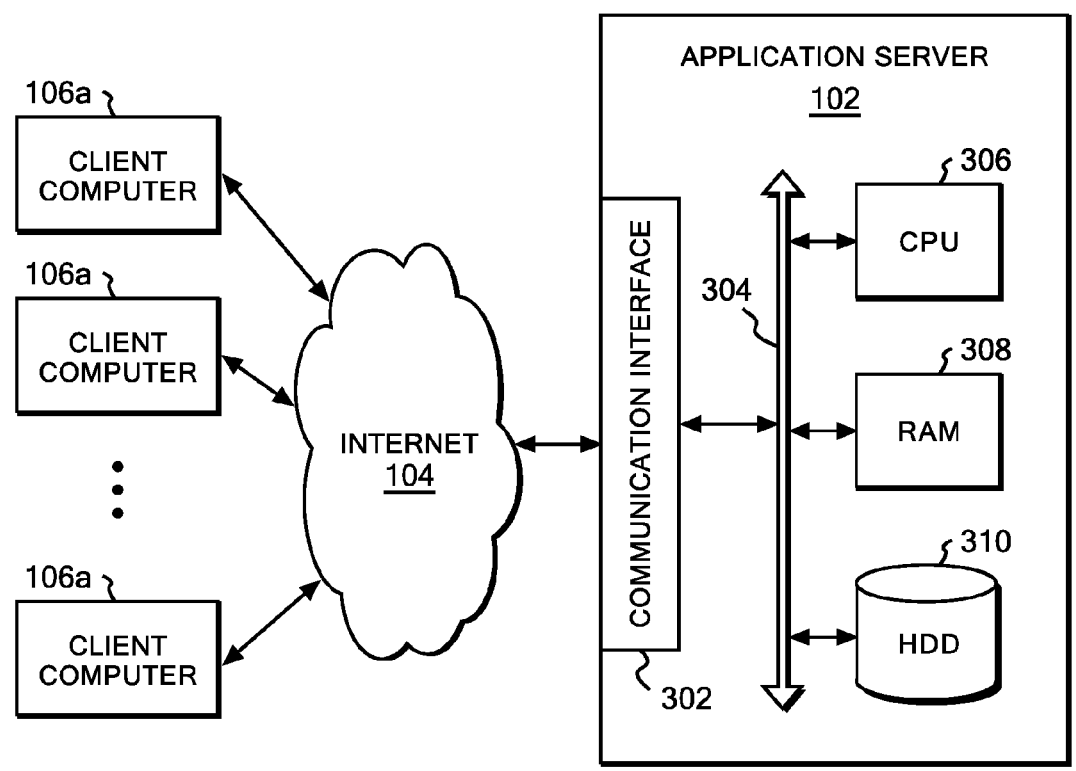
FIG. 3 is a diagram showing a hardware configuration of the application server.

FIG. 3 is a schematic block diagram of a hardware configuration of the application server 102. As shown in FIG. 3, the client computers 106a, 106b, ... and 106z are connected to a communication interface 302 of the application server 102 via the Internet 104. The communication interface 302 is further connected to a bus 304. In addition, a CPU 306, a main memory (RAM) 308 and a hard disk drive (HDD) 310 are connected to the bus 304.

Although not shown, a keyboard, a mouse and a display are connected to the application server 102. The management and maintenance operation of the entire application server 102 may be performed by using these components.

An operating system and a user ID and password correspondence table used for login management of the client computers 106a, 106b, ... and 106z are stored in the hard disk drive 310 of the application server 102. In addition, software such as APACHE for causing the application server 102 to function as a Web server, JAVA EE for implementing a JAVA virtual environment, and a later described processing program according to the present invention, which operates on a JAVA virtual environment, are saved in the hard disk drive 310. These software programs are loaded in the main memory 308 at the time of starting the application server 102 and then operate. Thus, the client computers 106a, 106b, ... and 106z can access the application server 102 by TCP/IP protocols.

Incidentally, as the aforementioned application server 102, a server model such as IBM (trademark of International Business Machine Corporation) SYSTEM X, SYSTEM I, or SYSTEM P, which can be purchased from IBM, can be used. Examples of usable operating systems in this case include AIX (trademark of IBM), UNIX (trademark of The Open Group), LINUX (trademark), WINDOWS (trademark) 2003 Server and the like.

Next, a logical configuration of the embodiment of the present invention will be described with reference to a functional block diagram of FIG. 4.

Figure 4:
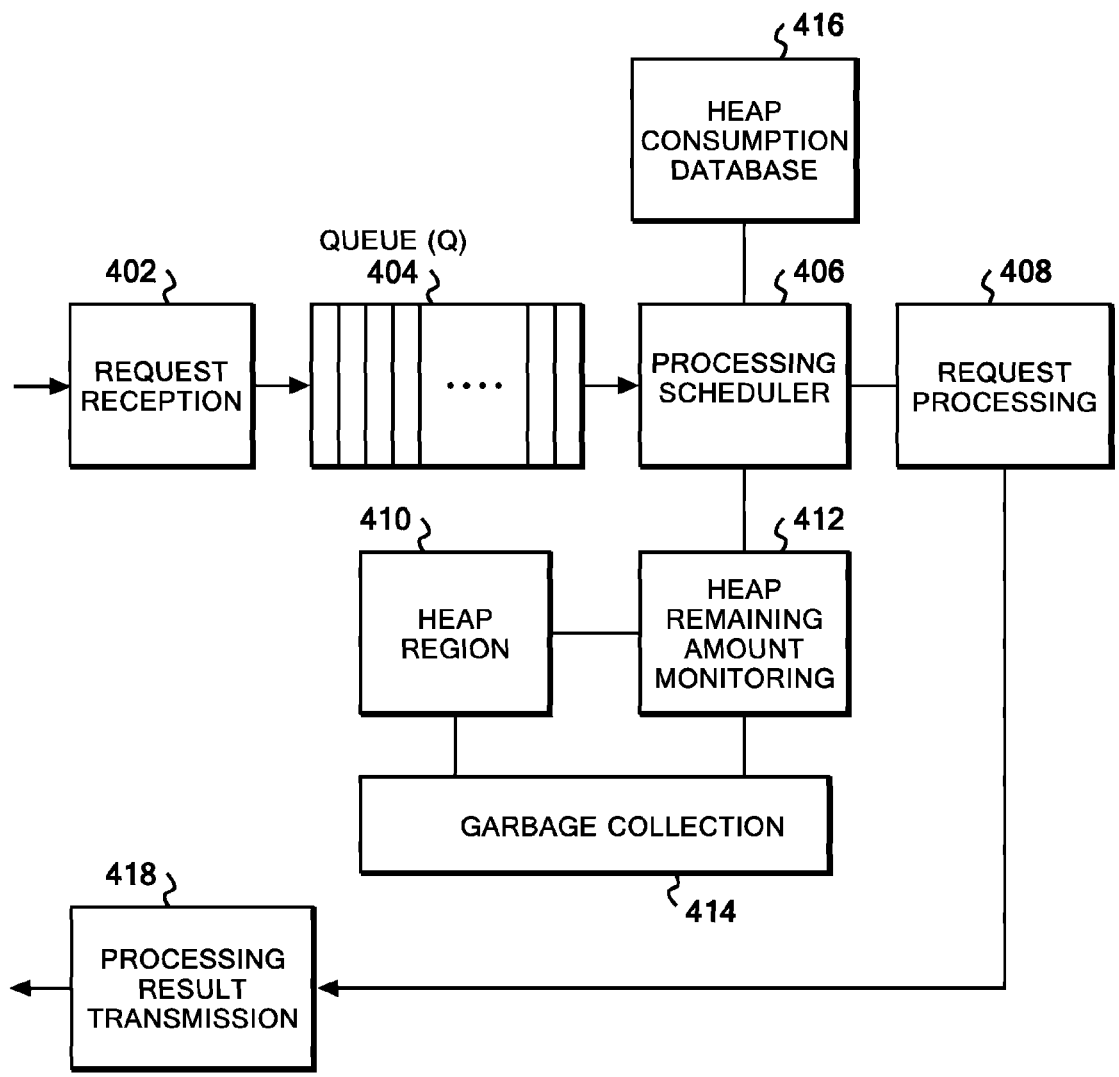
FIG. 4 is a functional block diagram of an embodiment of the present invention.

In FIG. 4, a request reception module 402 is actually a part of software such as APACHE, which operates as a Web server, and receives requests sent from the client computers 106a, 106b, ... and 106z by a protocol such as HTTP and then enqueues the requests in a queue 404. The queue 404 preferably corresponds to a memory region allocated on the main memory 308. The requests can be sequentially dequeued from the queue 404, and the order of the requests in the queue 404 can be changed by an operation of a processing scheduler 406 for a request processing module 408.

Here, the request processing module 408 may be actually considered as a group of programs which are written in JAVA programming language and which perform various functions. In other words, a different program is called in accordance with a request type.

A heap region 410 is allocated on the main memory 308. In the heap region 410, memory is consumed every time the request processing module 408 processes a request. A heap remaining amount monitoring module 412 monitors the remaining amount of useable heap, and when the remaining amount runs short, the heap remaining amount monitoring module 412 calls a garbage collection function 414 and reallocate a region for the capacity of the heap region 410. Here, the garbage collection function 414 performs "Stop the world" type garbage collection and is a basic function of the JAVA virtual machine.

Note that, the processor scheduler 406, the request processing module 408 and the heap remaining amount monitoring module 412 are programs written in JAVA programming language and are preferably configured as threads operating in parallel when the application server 102 is started.

A heap consumption database 416 is a database used for recording an estimated heap consumption for each request type. The estimated consumptions are preferably recorded in the hard disk drive 310, permanently, but may be stored in the main memory 308. Note that, a request in this embodiment is to display an ordinary Web page, to process a search, to display a layout of multiple Web pages or the like, for example. In addition, a request type is a character string such as browse.jsp?id=123 specified as a parameter in a URL transmitted from a client computer. Such a character string is extracted by syntax parsing by JAVA middleware. In accordance with such a parameter, a corresponding JAVA program is called.

The processing scheduler 406 processes the queue 404 on the basis of the information from the heap remaining amount monitoring module 412 and the heap consumption database 416 and sends a request to the request processing module 408. More details of the processing will be described with reference to a flowchart shown in FIG. 5 and below.

The processing result of the request processing module 408 is sent via a processing result transmission module 418 to the client computer that has made the request. The processing result transmission module 418 is preferably implemented as a part of software such as APACHE, which operates as a Web server.

Figure 5:
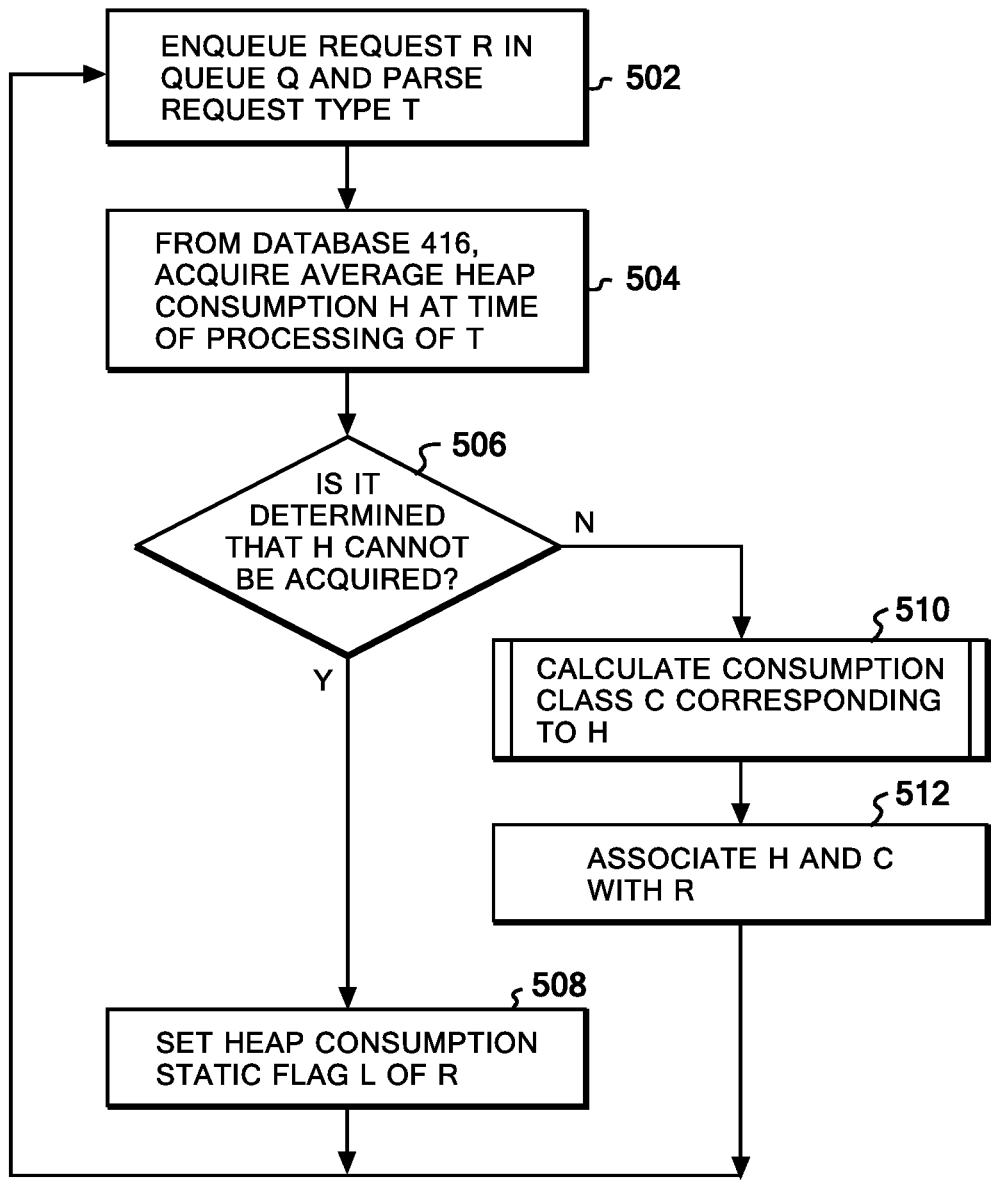
FIG. 5 is a diagram showing a flowchart of processing performed when a request arrives in a queue.

FIG. 5 is a flowchart of processing performed by the processing scheduler 406 when a request R arrives in the queue 404 (hereinafter, also referred to as a queue Q). When the request R enters the queue Q in step 502, the processing scheduler 406 parses a request type T by use of a syntax parsing function of middleware.

Next, in step 504, the processing scheduler 406 accesses the database 416 and then attempts to acquire an estimated average heap consumption H at the time of processing of the request type T. When it is determined in step 506 that H cannot be acquired, i.e., the request is a type that has not been yet processed by the processing scheduler 406, the processing scheduler 406 sets a heap consumption statistic flag L of the request R in step 508 and then returns to step 502 where the processing waits for the next request to arrive in the queue. This leads to measurement of a heap consumption of the request R by different processing, and registration of a heap consumption required for the type T of the request in the database 416.

Upon returning to step 506, when the average heap consumption H at the time of processing of T is acquired, the processing scheduler 406 calculates a class C corresponding to the average heap consumption H. Next, in step 512, H and C are associated with the request R, and then, the processing returns to step 502 where the processing waits for the next request to arrive in the queue.

Figure 6:
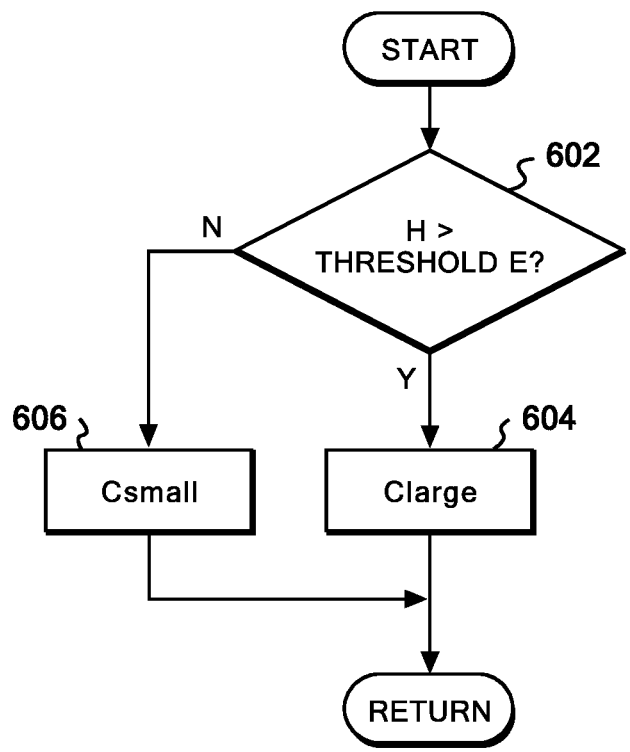
FIG. 6 is a flowchart of processing to categorize requests into heap consumption classes.

FIG. 6 is a flowchart showing detailed processing of step 510. In step 602, the processing scheduler 406 determines whether or not the average heap consumption H acquired in step 504 is larger than a certain threshold E. If yes, the processing scheduler 406 sets the class of the average heap consumption H to be Clarge in step 604. If no, the processing scheduler 406 sets the class of the average heap consumption H to be Csmall in step 606.

Figure 7:
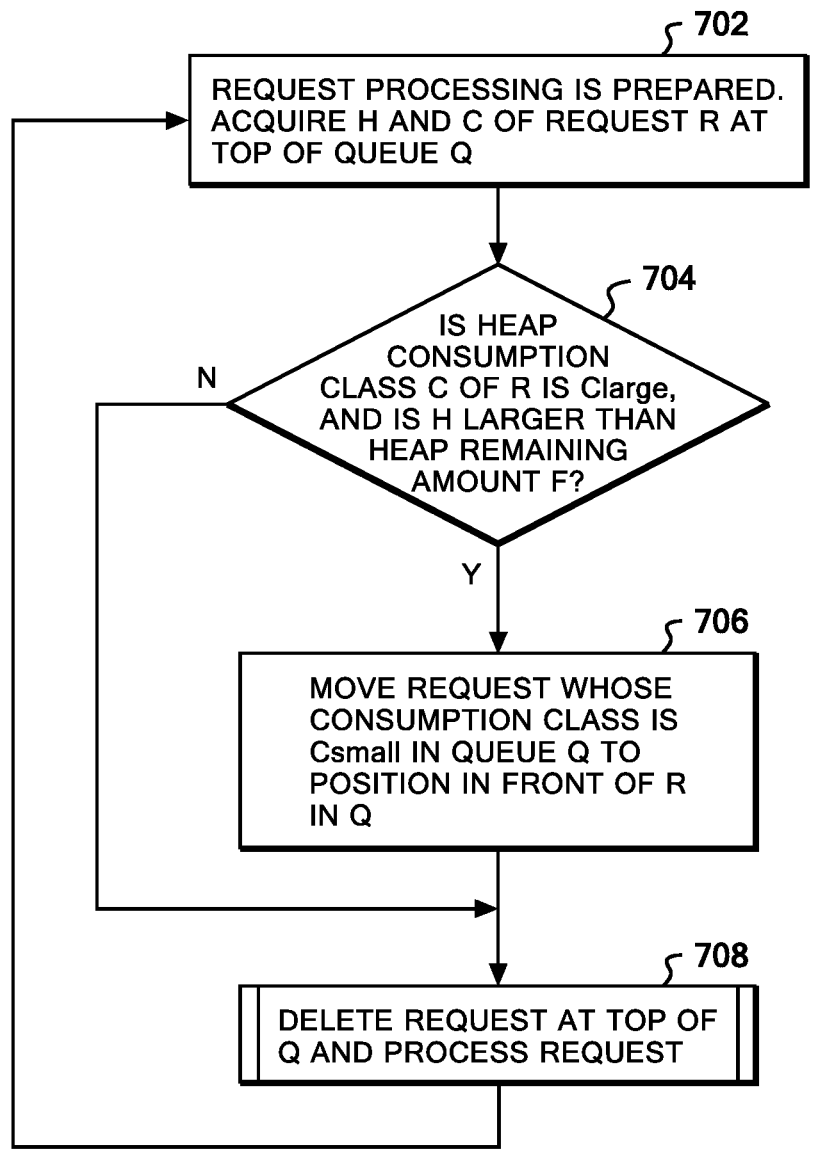
FIG. 7 is a flowchart of processing performed when a request is deleted from a queue, and processing is performed.

FIG. 7 is a flowchart showing processing in which the processing scheduler 406 deletes and then processes a request from the queue Q.

In step 702, the processing scheduler 406 sends a query to the request processing module 408 and determines whether or not request processing is prepared. If yes, the processing scheduler 406 acquires H and C of the request R at the top of the queue Q. These values are acquired in the processing in the flowchart of FIG. 5 when the request is enqueued in the queue Q.

In step 704, the processing scheduler 406 determines whether or not the heap consumption class C of the request R at the top of the queue is Clarge and whether or not H is larger than a heap remaining amount F. Here, the heap remaining amount F is acquired from the heap remaining amount monitoring module 412.

If the result of the determination in step 704 is positive, a request whose consumption class is Csmall in the queue Q is moved so as to be positioned in front of the request R in the queue Q. Accordingly, the request whose consumption class is Csmall is positioned at the top of the queue Q. Then, the processing proceeds to step 708.

If the result of the determination in step 704 is negative, the processing immediately proceeds to step 708.

Figure 8:
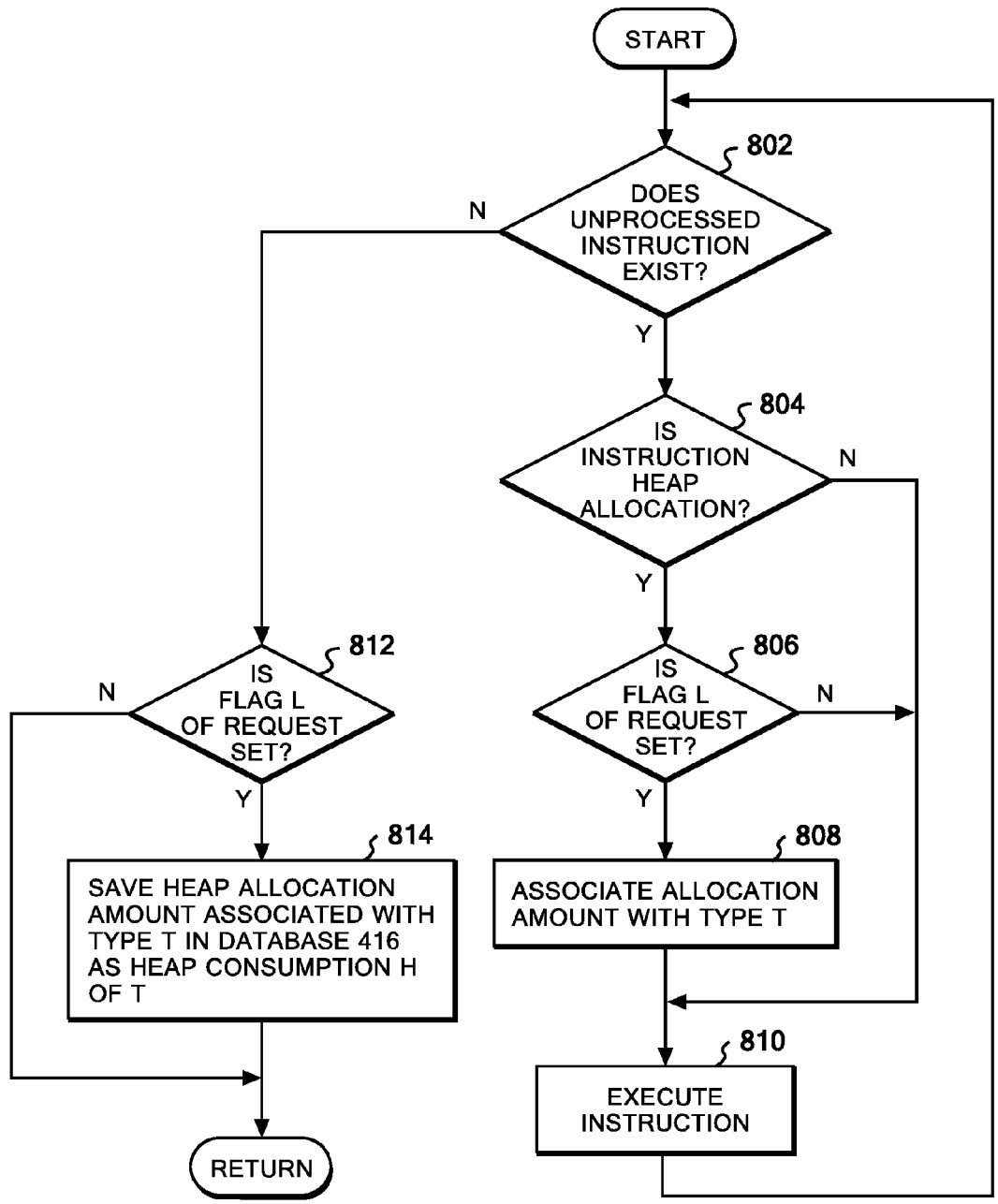
FIG. 8 is a flowchart of processing to measure a heap consumption of a request.

In step 708, the processing scheduler 406 deletes the request at the top of the queue Q and calls processing in the flowchart of FIG. 8. Then, the processing returns to step 702.

Next, processing after deletion of the request in step 708 of FIG. 7 will be described in more detail with reference to the flowchart of FIG. 8. In FIG. 8, a worker thread (not shown) different from the processing scheduler 406 determines in step 802 whether or not an unprocessed instruction exists. If yes, the processing proceeds to step 804 and the worker thread determines whether or not the instruction is for heap allocation. If yes, the processing proceeds to step 806 and the worker thread determines whether or not the flag L of the request is set. The flag L of the request is supposed to be set in accordance with a condition in the processing of step 508 in the flowchart of FIG. 5, and setting of the flag L means that a heap consumption statistic of the request is to be measured and recorded.

Accordingly, in step 808, the worker thread associates the heap allocation amount of the current instruction with the type T of the request and proceeds to execution of the instruction in step 810.

Even in a case where the instruction is not for heap allocation in step 804, or where the flag L of the request is not set in step 806, the processing directly proceeds to step 810.

Upon returning to step 802, when it is determined that there is no unprocessed instruction, the processing proceeds to step 812, and the worker thread determines whether or not the flag L of a request is set. If yes, in step 814 the worker thread saves the heap allocation amount associated with the type T in the database 416 as the heap consumption of T, and then returns to step 708. If no flag L of a request is set, the processing immediately returns to step 708.

For the purpose of achieving understanding of the processing of the embodiment in more details, the operation will be described through the overall processing. Firstly, when the user of the client computer 106a calls a Web browser on the display 216 and clicks a predetermined operation button (not shown), a request including a predetermined URL and an additional parameter indicating a request type is sent to the application server 102 in accordance with an HTTP protocol via the Internet line. Here, an assumption is made that the request is to display layout of a Web page list.

The request sent from the client computer 106a is received by the reception module 402 of the application server 102 and then is enqueued in the queue 404. At this time, as described in step 502, the additional parameter indicating a request type is extracted by syntax parsing by the middleware.

In step 504, based on the request type T, the processing scheduler 406 accesses the heap consumption database 416 and attempts to acquire a heap consumption H of the request type T. Here, if the request type T is one that has already been processed, the heap consumption H can be acquired. Accordingly, an assumption is made that the request is determined to be Clarge by the processing of the flowchart in FIG. 6 on the basis of the value of H. The request is set to a request 1.

Similarly, suppose that another request is subsequently sent to the request reception module 402 of the application server 102 from the client computer 106b. The request is then enqueued in the queue 404. At this time, as described in step 502, the additional parameter indicating a request type is extracted by syntax parsing by the middleware. An assumption is made that the request is to display a simple Web page in this case.

In step 504, based on the request type T, the processing scheduler 406 accesses the heap consumption database 416 and attempts to acquire a heap consumption H of the request type T. Here, if the request type T is one that has already been processed, the heap consumption H can be acquired. Accordingly, an assumption is made that the request is determined to be Csmall by the processing of the flowchart in FIG. 6 based on the value of H. The request is set to a request 2.

Figure 9:
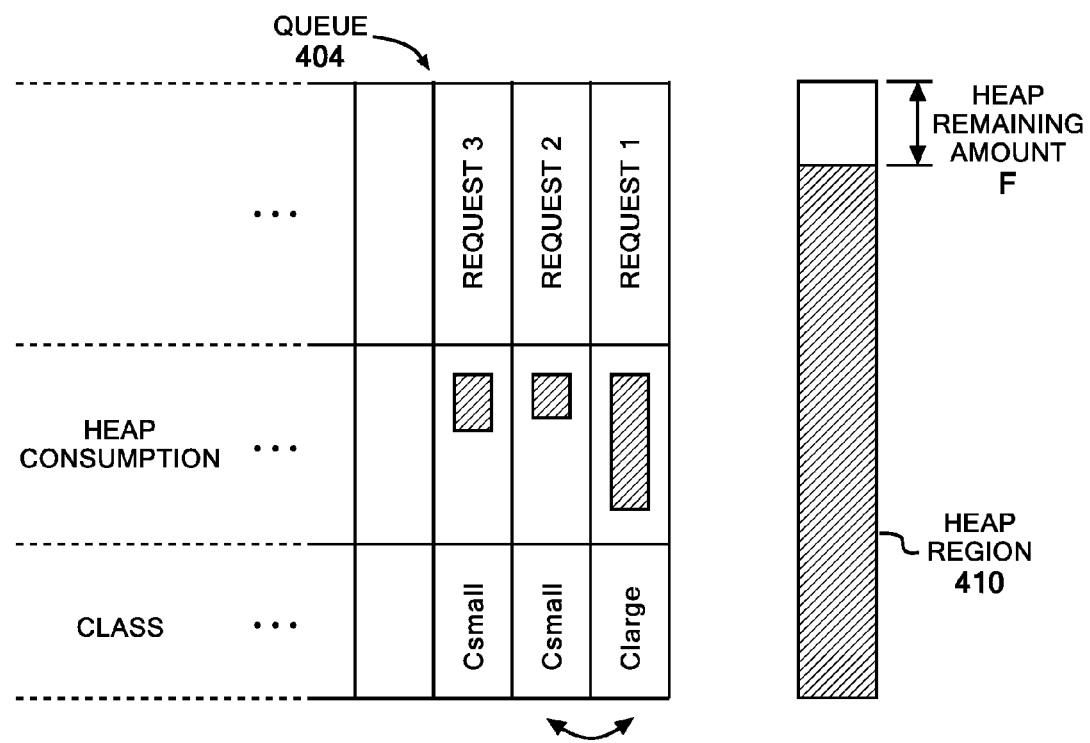
FIG. 9 is a diagram for describing processing to determine the order of processing requests in consideration of the remaining amount of heap, heap consumptions and heap consumption classes of the requests.

Then, as shown in FIG. 9, the request 1, which is the request to display layout of a Web page list, from the client computer 106a is positioned at the top of the queue 404, the request 2, which is the request to display a simple Web page, from the client computer 106b is positioned at the second position from the top in the queue 404.

However, when it is determined in step 704 that the request 1 at the top of the queue is Clarge and also that the heap consumption H of the request 1 is larger than the heap remaining amount F acquired from the heap remaining amount monitoring module 412, and if the request 1 is executed without any processing to avoid garbage collection, garbage collection surely occurs as it can be seen from FIG. 9.

Figure 10:
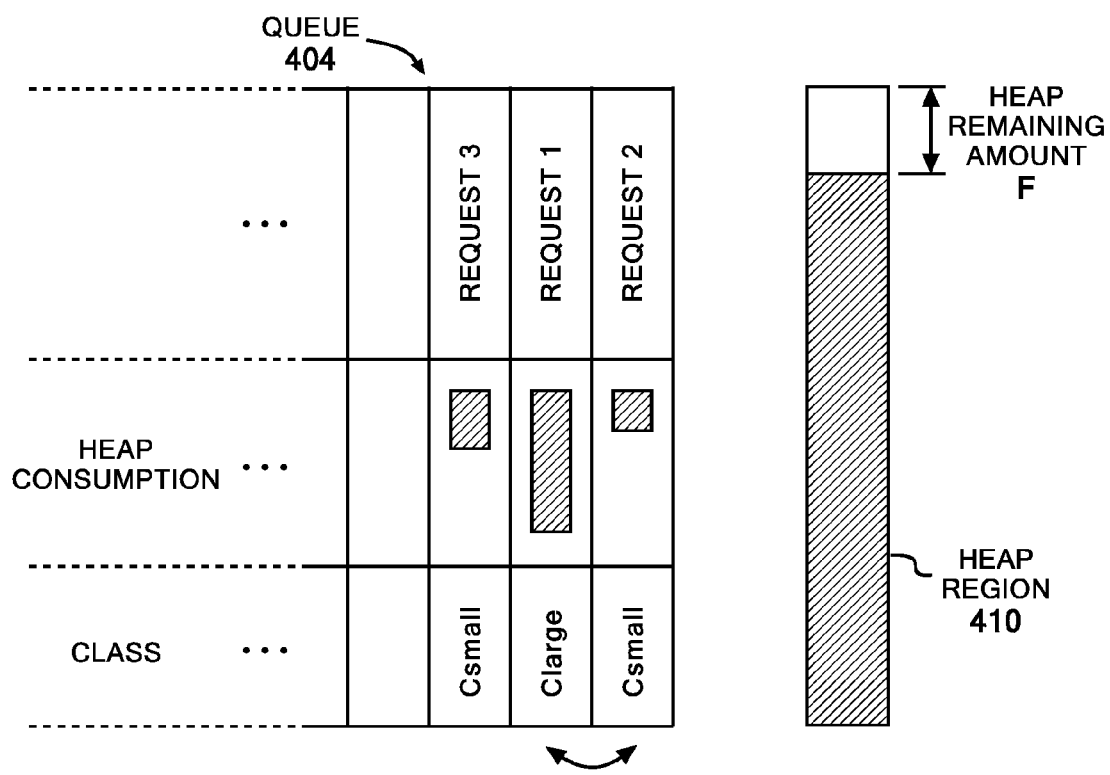
FIG. 10 is a diagram for describing processing to determine the order of processing requests in consideration of the remaining amount of heap, heap consumptions and heap consumption classes of the requests.

Thus, in step 706, the processing scheduler 406 searches the queue 404 from the top of the requests to find a request that is Csmall. Then, since the next request 2 is Csmall incidentally, the processing scheduler 406 moves the request 2 to the top of the queue 404 and causes the request processing module 408 to process the request 2 as shown in FIG. 10. Thus, since the heap consumption H is smaller than the heap remaining amount F, occurrence of garbage collection can be avoided at this moment. In this manner, the number of requests to be processed before occurrence of garbage collection can be increased to the utmost extent.

Figure 11:
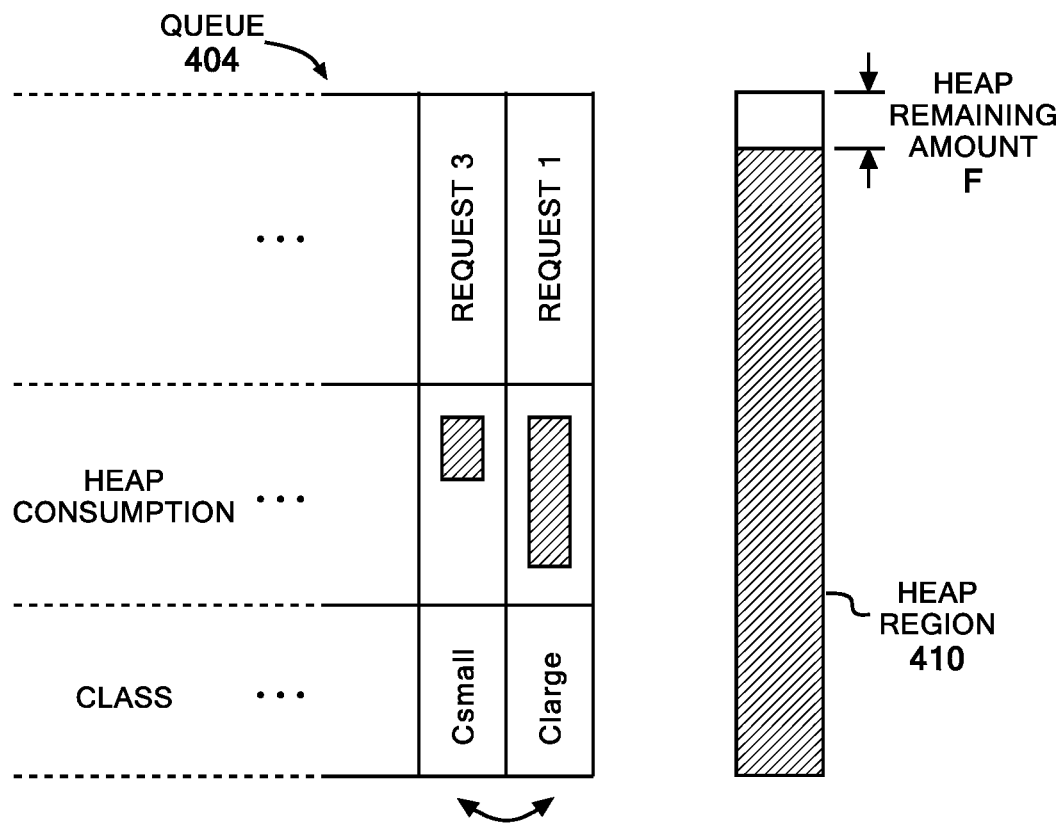
FIG. 11 is a diagram for describing processing to determine the order of processing requests in consideration of the remaining amount of heap, heap consumptions and heap consumption classes of the requests.

When the request 2 is processed, the request 1 is positioned at the top of the queue 404 as shown in FIG. 11. The heap remaining amount F is further reduced because of the execution of the request 2. Here, since the heap consumption H of the request 1 is obviously larger than the heap remaining amount F, a request that is a Csmall is searched for in accordance with the determination in step 706. Here, since the next request is Csmall, processing to move the request 3 to the top of the queue 404, which results in moving the request 1 to the second position, is performed.

As described above, according to the present invention, when it is predicted that execution of a Clarge request causes garbage collection, a Csmall request is executed preferentially. As the heap remaining amount F decreases, there eventually comes a point where garbage collection is no longer avoidable even with execution of a Csmall request. However, the present invention can reduce the average wait time of requests, because as many requests as possible can be processed before occurrence of garbage collection.

Note that, in a case where the average heap consumption H cannot be acquired in step 506 because the target request is a request type that has not been processed so far, the heap consumption statistic flag L for the request is set in step 508, but the average heap consumption H cannot be acquired immediately.

Specifically, the timing when the average heap consumption H of the request is acquired and then recorded in the database 416 is after the request is processed as shown in the flowchart of FIG. 8. Accordingly, when such a request becomes ready for processing and is subjected to the determination processing in step 704, both the consumption class C and the average heap consumption H are unknown. Accordingly, processing for a request whose consumption class C and average heap consumption H are unknown may be proceeded while assuming that the class is Clarge and that the average heap consumption H is an average of the overall Clarge classes in step 704.

After the request is processed, the average heap consumption H of the request type is recorded in the database 416. Accordingly, the consumption class C and the average heap consumption H appropriate to the request of the request type are assigned for the next processing.

Note that, in the aforementioned embodiment, requests are categorized into Csmall and Clarge in accordance with the types, but the requests may not be categorized into classes in particular. In this case, a request that is determined to be a request not causing garbage collection, on the basis of only the average heap consumption H and the heap remaining amount F in step 704 may be moved to the top of the requests and then processed preferentially.

In addition, it is to be understood that although the aforementioned embodiment is described on the basis of JAVA VM implementation, the present invention is applicable to a standalone environment regardless of whether or not the system is a server-client environment, as long as the system has a processing queue and garbage collection may occur in the system. In addition, the present invention is not limited to a particular OS or application either as a matter of course.

REFERENCE SIGNS LIST

102 . . . application server, 104 . . . Internet, 202 . . . bus, 206 . . . main memory, 204 . . . CPU, 208 . . . IDE controller, 212 . . . DVD drive, 214 . . . display controller, 218 . . . communication interface, 220 . . . USB interface, 222 . . . audio interface, 228 . . . keyboard and mouse controller, 216 . . . display apparatus, 230 . . . keyboard, 232 . . . mouse, 210 . . . hard disk drive, 302 . . . communication interface, 304 . . . bus, 306 . . . CPU, 310 . . . hard disk drive, 308 . . . main memory, 402 . . . request reception module, 404 . . . queue, 406 . . . processing scheduler, 408 . . . request processing module, 410 . . . heap region, 412 . . . heap remaining amount monitoring module, 414 . . . garbage collection function, 416 . . . heap consumption database, 418 . . . processing result transmission module.

The invention claimed is:

1. A request processing system for processing requests in a system that has a queue for storing the requests to be processed and is configured to execute garbage collection when a heap remaining amount is insufficient to process a request dequeued from the queue, the request processing system comprising:

a computer with at least one processor and memory;

a heap consumption acquisition module executing in the memory of the computer and configured for acquiring an estimated heap consumption for each of requests that are to be processed and that exit in the queue, for determining that a request at the top of the queue has a larger estimated heap consumption acquired by the heap consumption acquisition means than the heap remaining amount and for finding, among the requests in the queue, a request whose estimated heap consumption is expected to be smaller than the heap remaining amount, and for moving the found request in the queue to a position ahead of the request positioned at the top of the queue.

2. The request processing system according to claim 1, wherein the heap consumption acquisition module is coupled to a database for recording therein a heap consumption of an already processed request on such a request type basis as to be searchable by request type.

3. The request processing system according to claim 1, wherein the module further is configured for categorizing the requests that are to be processed and that exit in the queue into first and second classes in accordance with the acquired estimated heap consumptions, the first class provided for a request whose heap consumption is larger than a threshold, the second class provided for a request whose heap consumption is smaller than the threshold, and for finding the request searches the queue for a request of the second class.

4. The request processing system according to claim 1, wherein the request processing system is a server on the Internet, and the requests are sent from a client computer via the Internet.

5. The request processing system according to claim 4, wherein the server is implemented by a JAVA virtual machine (VM).

6. A request processing program product for processing requests in a system that has a queue for storing the requests to be processed and is configured to execute garbage collection when a heap remaining amount is insufficient to process a request dequeued from the queue, the request processing program product comprising a non-transitory computer usable storage medium storing program code that when executed by a computer of the system causes the computer of the system to execute the steps of:
    acquiring an estimated heap consumption for each of requests that are to be processed and that exit in the queue;
    determining that a request at the top of the queue has a larger estimated heap consumption than the heap remaining amount, finding, among the requests in the queue, a request whose estimated heap consumption is expected to be smaller than the heap remaining amount; and
    moving the found request in the queue to a position ahead of the request positioned at the top of the queue.

7. The program product according to claim 6, wherein the step of acquiring the estimated heap consumption includes the step of recording a heap consumption of an already processed request on such a request type basis as to be searchable by request type.

8. The program product according to claim 6, further comprising the step of categorizing the requests that are to be processed and that exit in the queue into first and second classes in accordance with the acquired estimated heap consumptions, the first class provided for a request whose heap consumption is larger than a threshold, the second class provided for a request whose heap consumption is smaller than the threshold, wherein
    in the step of finding the request, the queue is searched to find a request of the second class.

9. The program product according to claim 6, wherein the system is a server on the Internet, and the requests are sent from a client computer via the Internet.

10. The program product according to claim 9, wherein the server is implemented by a JAVA virtual machine (VM).

\* \* \* \* \*